(12) United States Patent
Fischer et al.

(10) Patent No.: US 6,409,061 B1
(45) Date of Patent: Jun. 25, 2002

(54) HOLDING DEVICE FOR A BEVERAGE CONTAINER

(75) Inventors: Heinz Fischer, Waldachtal; Ulrich Nienhaus, Nagold; Michaela Aigner, Boeblingen, all of (DE)

(73) Assignee: Fischerwerke Artur Fischer GmbH & Co. KG, Waldachtal (DE)

( * ) Notice: Subject to any disclaimer, the term of this patent is extended or adjusted under 35 U.S.C. 154(b) by 48 days.

(21) Appl. No.: 09/638,117

(22) Filed: Aug. 14, 2000

(30) Foreign Application Priority Data

Sep. 18, 1999 (DE) .......................... 199 44 817

(51) Int. Cl.$^7$ ............................... B60R 7/00
(52) U.S. Cl. ............ 224/281; 224/282; 224/926; 248/311.2
(58) Field of Search ................ 224/281, 282, 224/926, 539, 483; 248/311.2

(56) References Cited

U.S. PATENT DOCUMENTS

| | | | |
|---|---|---|---|
| 4,955,571 A | | 9/1990 | Lorence et al. |
| 5,487,519 A | * | 1/1996 | Grabowski ............... 248/311.2 |
| 5,489,054 A | * | 2/1996 | Schiff .......................... 224/281 |
| 5,692,658 A | * | 12/1997 | Fischer et al. .............. 224/281 |
| 5,749,554 A | * | 5/1998 | Avila et al. ............... 248/311.2 |

FOREIGN PATENT DOCUMENTS

| | | |
|---|---|---|
| DE | 44 23 097 A1 | 1/1995 |
| DE | 197 17 011 A1 | 11/1998 |
| DE | 198 05 017 A1 | 8/1999 |
| JP | 6-115391 | 4/1994 |

OTHER PUBLICATIONS

Patent Abstract of Japan M–1623, Jun. 17, 1994 vol. 18/No. 319.
Patent Abstract of Japan 07101283 A, Apr. 18, 1995.

* cited by examiner

Primary Examiner—Stephen K. Cronin
Assistant Examiner—Maerena W. Brevard
(74) Attorney, Agent, or Firm—Michael J. striker

(57) ABSTRACT

A holding device for a beverage container, installable in a motor vehicle, has a carriage displaceably guided from an inserted position into a pulled-out position in a manner of a drawer, a sliding guide element which displaceably guides the carriage between the positions, a holder having an insertion opening for an insertion of a beverage container, the holder being pivotably mounted on the carriage, a pivotal joint through which the holder is pivotally mounted on the carriage, the holder being so mounted on the carriage as to be pivotable through approximately 90° to a side so that in the pivoted-out position the holder is located substantially at the side next to the carriage.

5 Claims, 5 Drawing Sheets

HOLDING DEVICE FOR A BEVERAGE CONTAINER

BACKGROUND OF THE INVENTION

The invention relates to a holding device for a beverage container, such as for example, a beverage can, a cup or a beaker, for installation, for example, in a dashboard of a motor vehicle.

Such holding devices are known per se. They have a carriage which is displaceably guided from an inserted position into a pulled-out position in the manner of a drawer by means of a sliding guide element. The carriage itself, or a holder attached to it, has an insertion opening, which is usually circular, and into which the beverage container is insertable when the carriage is in the pulled-out position. In the inserted position, the carriage or the holder preferably closes flush with the dashboard or the like.

The known holding devices have the disadvantage that, when they are in the pulled-out position, they conceal control or display elements mounted beneath them and consequently hinder access to those elements or prevent them from being read. Also, the carriage with the holder in the pulled-out position may be in the way when a transmission lever is operated.

SUMMARY OF THE INVENTION

Accordingly, it is an object of the present invention to provide a holding device which is formed so that the readability and operability of control and display elements mounted beneath it are not, or are only slightly, hindered.

In keeping with these objects and with others which will become apparent hereinafter, one feature of present invention resides, briefly stated in a beverage container in which a holder is pivotably mounted on a carriage by a pivotable joint, and the holder is so mounted on the carriage as to be pivotable through approximately 90° to the side, so that in a pivoted-out position the holder is located substantially at the side, next to the carriage.

In the holding device according to the invention, the holder with the insertion opening for the beverage container is pivotally mounted on the carriage by a pivotal joint. A pivotal axis of the pivotal joint is located in the side region of the carriage. The pivotal joint makes it possible for the holder to be pivoted through approximately 90° to the side, so that the holder is positioned substantially at the side, next to the carriage. The carriage can be so constructed that, when it is in the pulled-out position, it does not project from, or projects only slightly from, the dashboard or the like and consequently does not conceal control or display instruments that are mounted beneath the holding device. The holder pivots so far to the side that it, too, does not conceal control or di play elements mounted beneath the holding device.

In a preferred arrangement, the holding device according to the invention has a positive control means which is effective between the carriage and the holder and derives the pivotal movement of the holder from the displacement of the carriage and/or vice versa. The positive control means forcibly assigns a particular pivotal angle of the holder to a particular sliding position of the carriage, so that the holder cannot be moved independently of the carriage and the carriage cannot be moved independent of the holder. The positive control means may be in the form of, for example, a guide track arrangement having a fixed guideway mounted in a housing of the holding device, with a guide pin, mounted on the holder, engaging in the guideway.

In accordance with one embodiment of the invention, the holding device has an opening spring element which moves the carriage out of the inserted position into the pulled-out position. This has the advantage that the carriage travels automatically into the pulled-out position. In the inserted position, the carriage is held against the force of the opening spring element, for example, by a releasable locking device.

In a further development of the invention, the holding device has an intermediate element which the opening spring element engages. The intermediate element is displaceably guided by means of a sliding guide element in the direction in which the carriage slides; the intermediate element is thus displaced by the opening spring element once the carriage has been released. Rotatably mounted on the intermediate element is a toothed wheel which engages with a fixed-position toothed rack and, at an opposite side, with a toothed rack fixed relative to the carriage. The two toothed racks are arranged parallel to each other, extending in the direction in which the carriage slides, the spacing between them being so selected that the toothed wheel located between the two toothed racks engages with both toothed racks. As a result of the displacement of the intermediate element by the opening spring element that engages the intermediate element, the toothed wheel is displaced by the displacement distance of the intermediate element and, since it engages with the fixed-position toothed rack, is set in rotation. The displacement and rotation of the toothed wheel causes the toothed rack fixed relative to the carriage, with which rack the toothed wheel likewise engages, to be displaced at twice the speed and by the twice the distance of the intermediate element.

This embodiment of the invention thus provides for the carriage to be displaced by twice the distance of the intermediate element that the opening spring element engages. This embodiment of the invention has the advantage that it renders possible displacement of the carriage by a substantial distance, which is necessary especially when the holder pivotally mounted on the carriage is located in front of the carriage in the direction in which the carriage is pulled out. The carriage must in that case be displaced to such an extent that the entire holder is located in front of the dashboard or the like of the motor vehicle, so as to enable it to be pivoted through approximately 90° to the side.

In accordance with another embodiment of the invention, the holder has at least one support for supporting from below and from the side beverage container inserted into the holder, the support being pivotally mounted on the holder so that when the holding device is not in use it can be folded down onto or into the holder. This has the advantage that the holding device can be of flat construction and consequently be structurally space-saving. The support has a laterally projecting pivotal shaft about which the support is pivotable. For the purpose of pivoting the support, the pivotal shaft has a threaded surface along which a carriage slides as the holder is pivoted, and hence pivots the support.

In a further development of the invention, the carriage has a control element, for example a control pin, which engages in a control track in the holder. The control track follows an accurate path around the pivotal axis of the holder, the spacing from the pivotal axis of the holder, of course, varying over the length of the control track. When the holder is pivoted, the control element engaging in the control track of the holder brings about a displacement of the carriage, which in turn pivots the support by means of the threaded surface of the pivotal shaft. The pivotal movement of the support is in that manner derived from the pivotal movement of the holder.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
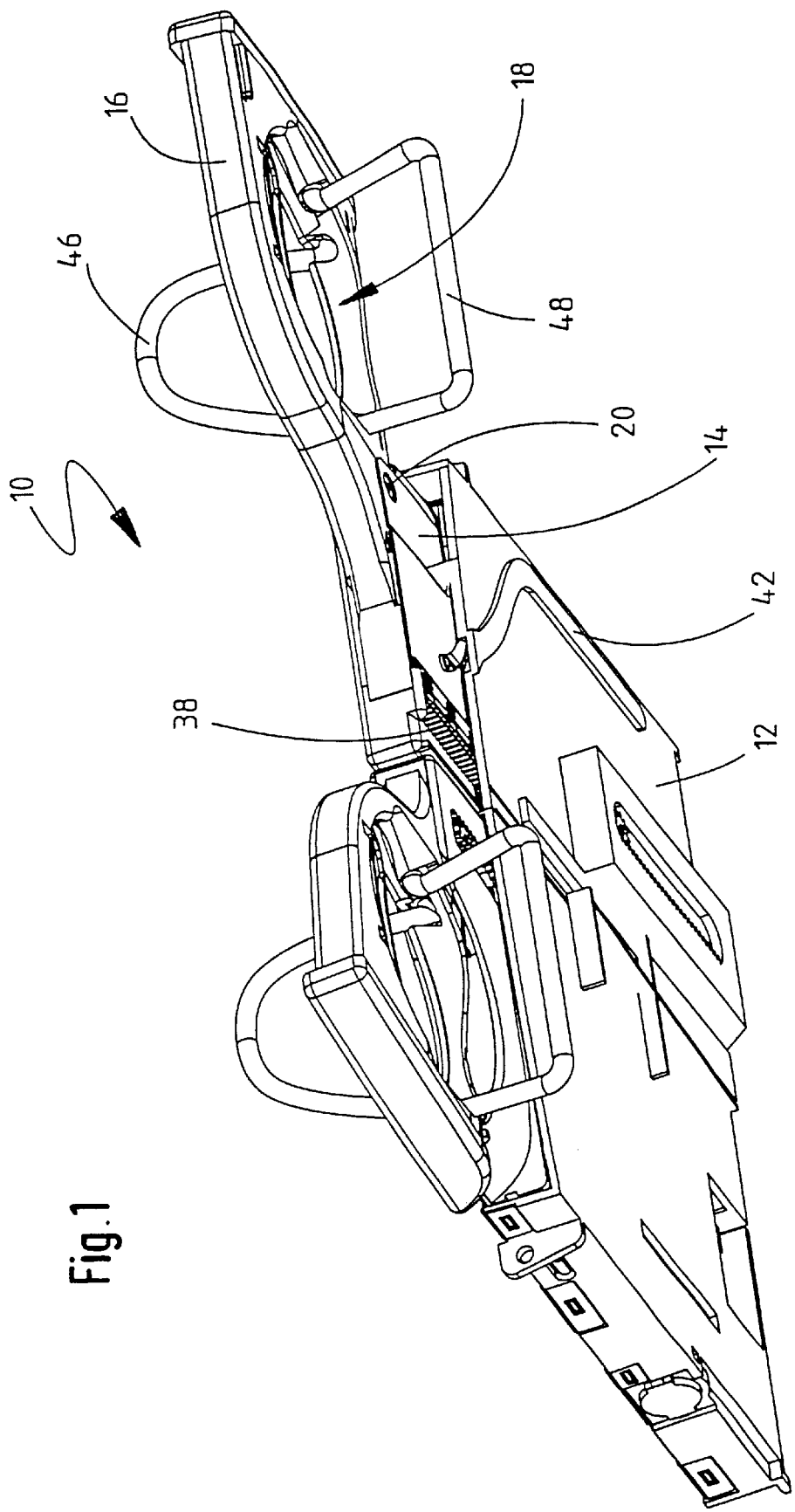
FIG. 1 shows a holding device according to the invention in an inclined perspective view from below.
Figure 2:
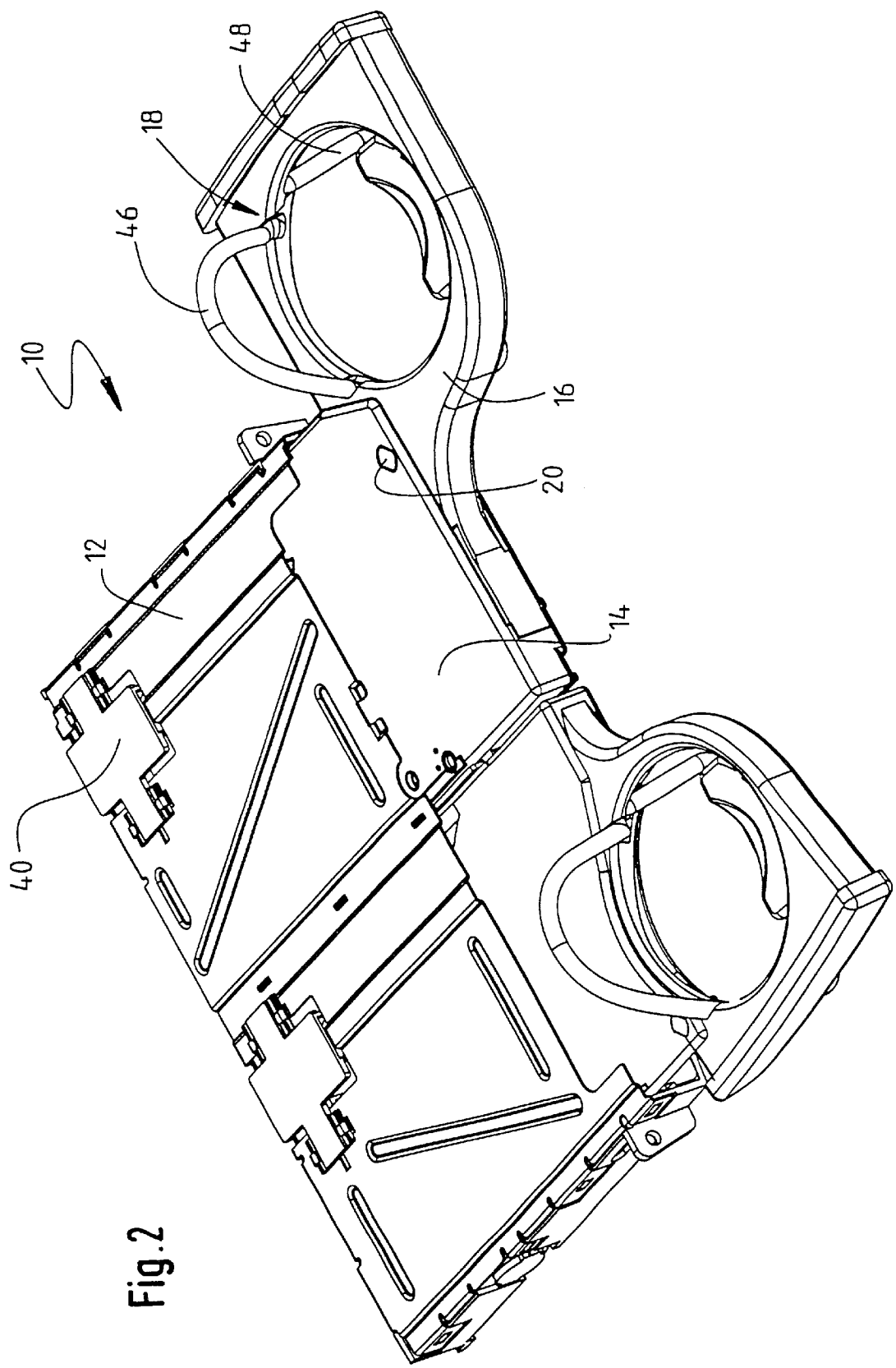
FIG. 2 shows the holding device of FIG. 1 in an inclined perspective view from above.
Figure 3:
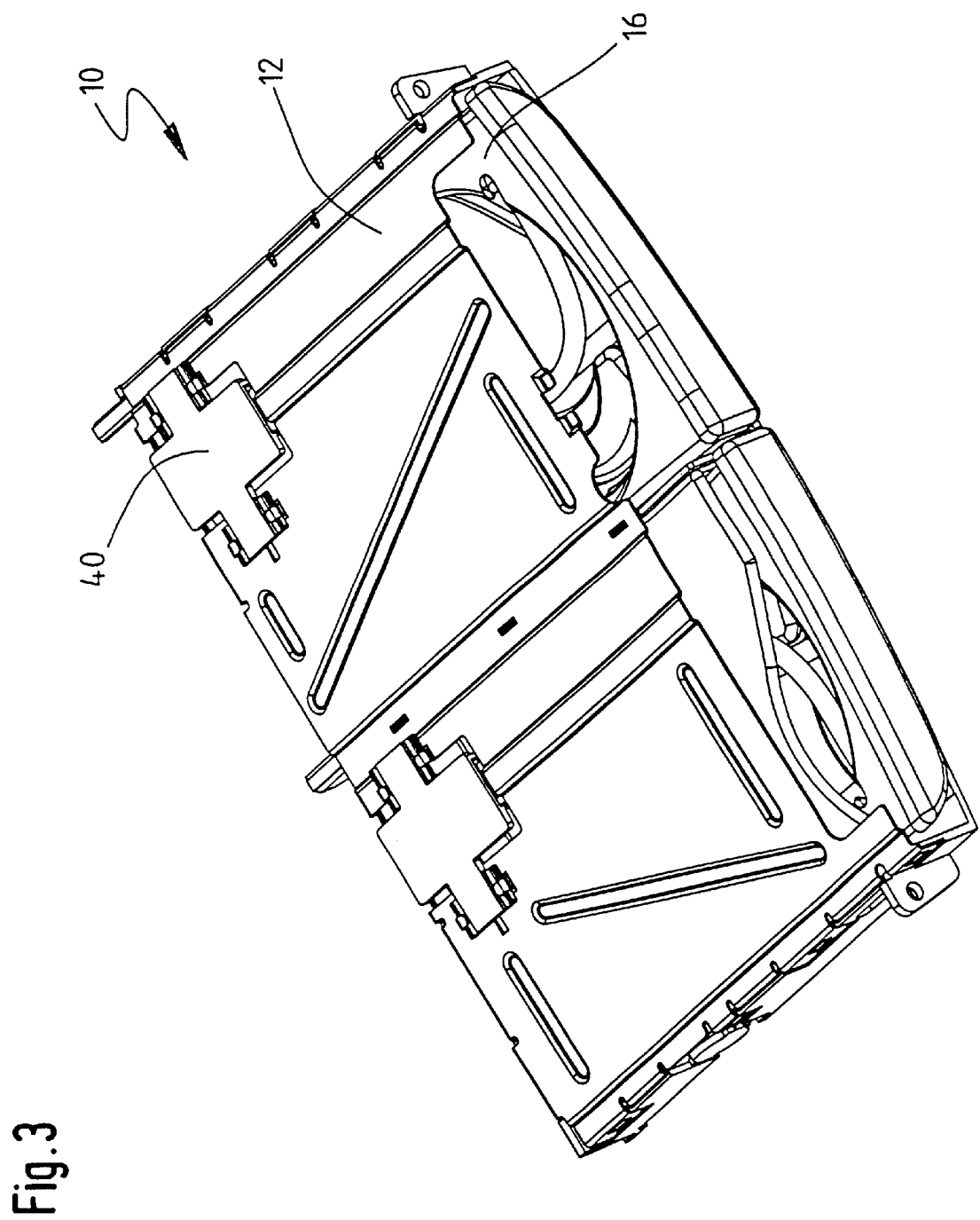
FIG. 3 shows the holding device according to FIG. 2 in the closed position.

The holding device 10 according to the invention illustrated in FIGS. 1 to 3 has a flat, box-shaped double housing 12 open at a front face, which housing is intended for installation in an assembly opening in a dashboard (not shown) of a motor vehicle. Two carriages 14 are guided displaceably in the manner of drawers, next to each other and independent of each other, in the double housing 12. The invention will be explained in the following with reference to the right-hand carriage 14 in the drawing, the left-hand carriage having a slightly different construction. The carriage 14 is box-shaped, its front side having an opening in which a holder 16 is pivotally mounted. The holder 16 is constructed as a box-like component; it has a circular hole which forms an insertion opening 18 for the insertion of a beverage container (not shown), such as, for example, a drinks can, a cup or a beaker.

The holder 16 is pivotally connected to the carriage 14 by means of a pin 20 which passes through it and through the carriage 14. The pin 20 is located at the front side of the carriage 14 close to the outside thereof. The holder 16 is pivotable through approximately 90° to the side so that, in its pivoted-out position, shown in FIGS. 1 and 2, it is located substantially at the side, next to the holding device 10 and next to the carriage 14. When the holder 16 is in the pivoted-in position, as shown in FIG. 3, it is located in front of the carriage 14. The inserted carriage 14 is located very close to the rear side of the double housing 12. The distance by which it is displaced corresponds to approximately one length of the double housing 12 in the direction of displacement since, in the pulled-out position, the carriage 14 projects to such an extent from the housing 12 that the pin 20 and the holder 16 are located in front of the double housing 12.

Figure 4:
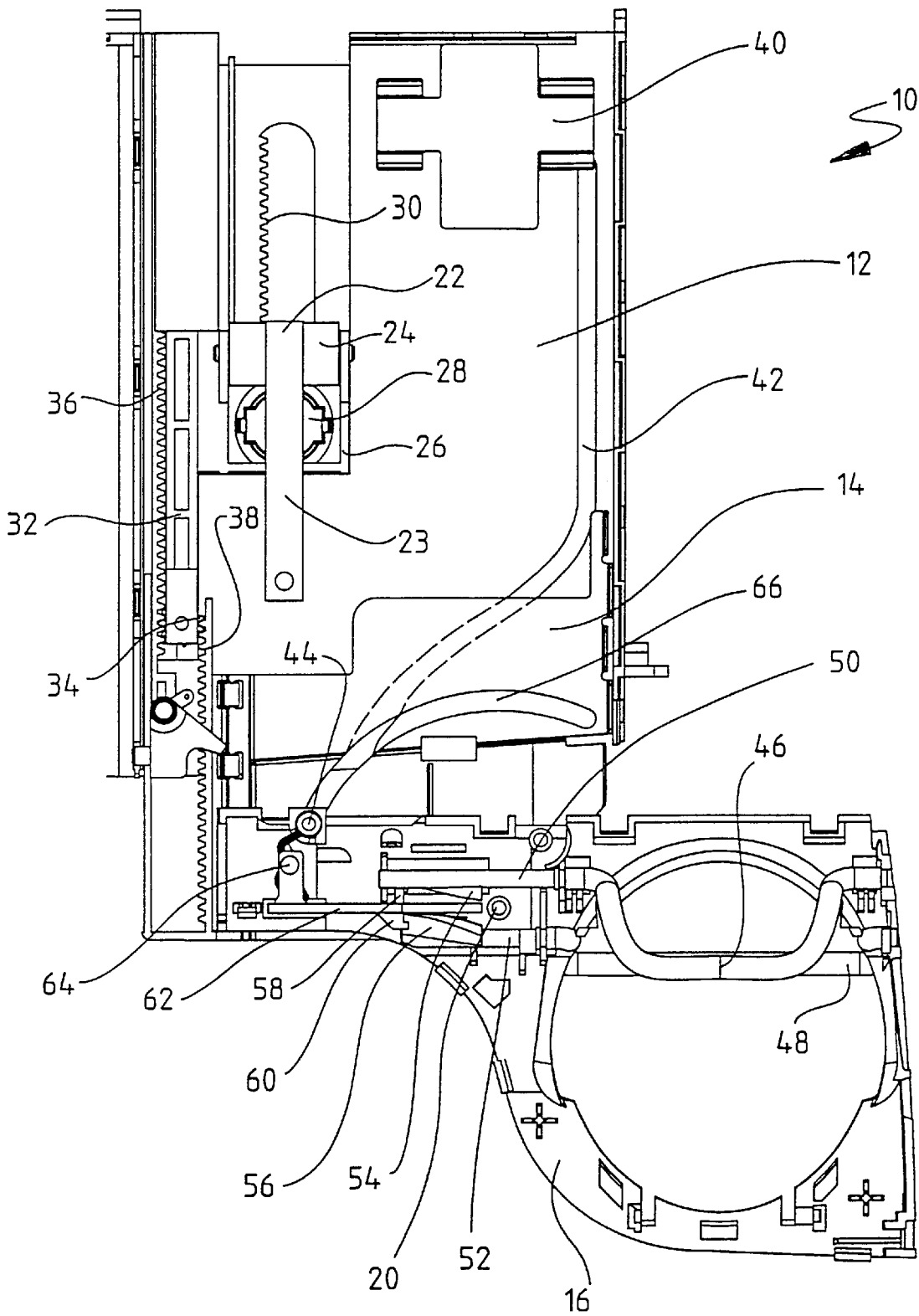
FIG. 4 is a plan view of the holding device of FIGS. 1 to 3 from which the upper parts have been omitted.
Figure 5:
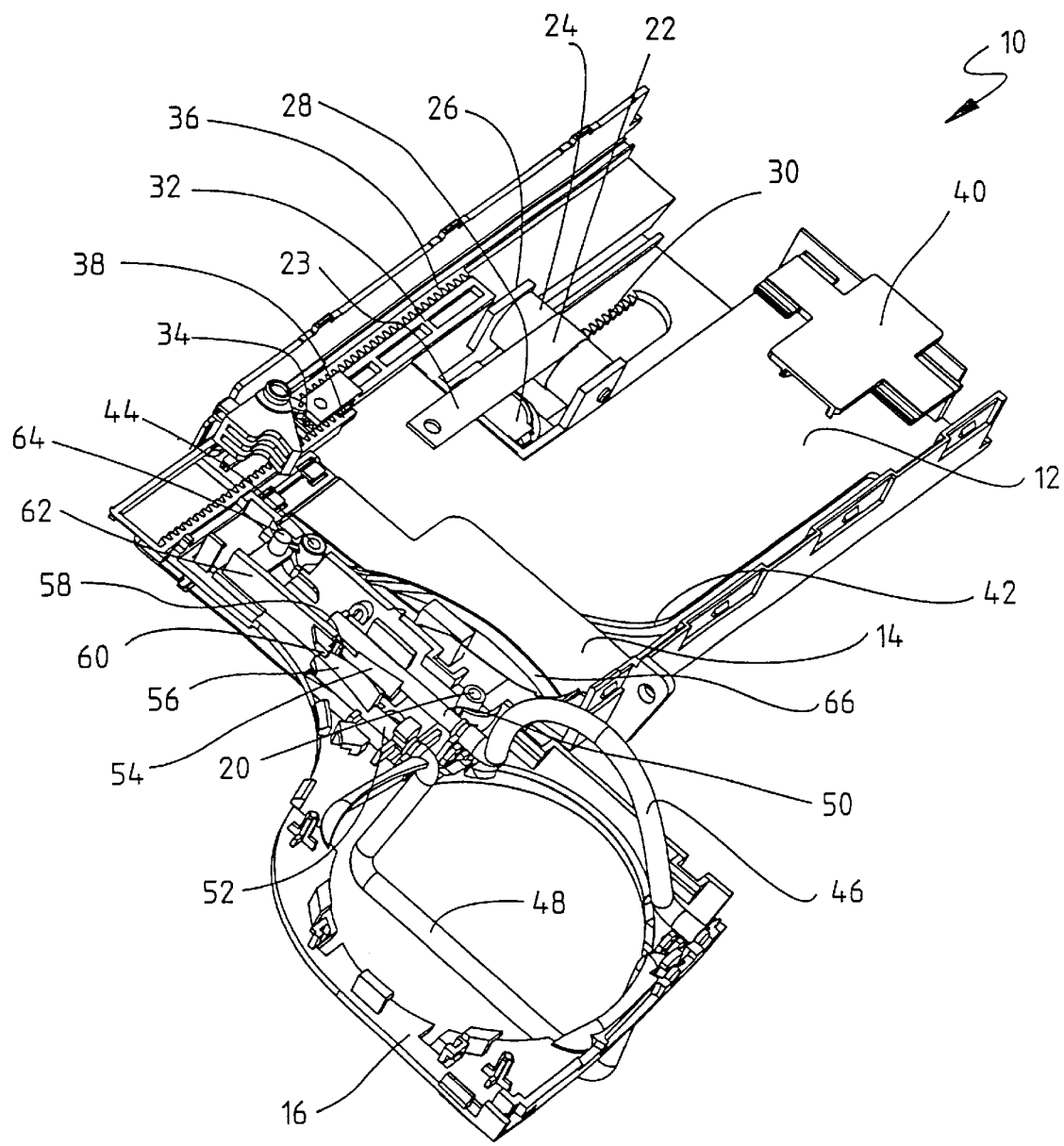
FIG. 5 is a perspective view of the holding device according to FIG. 4.

The construction and the operation of the holding device 10 according to the invention are explained in the following with reference to FIGS. 4 and 5 from which upper parts of the double housing 12, of the carriage 14 and of the holder 16 have been omitted so that the mechanics of the holding device 10 are visible. The holding device 10 has an opening spring element for the purpose of moving the carriage 14 into the pulled-out position. The opening spring element is in the form of a scroll spring 22. The scroll spring 22 is a leaf spring that rolls itself up into a coil as a result of its resilience. The scroll spring 22 is thus a tension spring. An uncoiled end 23 of the scroll spring 22 is fastened to a base of the double housing 12. The coil of the scroll spring 22 is wound on a roller 24, which is rotatably mounted about an axis in an intermediate element 26. The intermediate element 26 is so accommodated in the double housing 12 as to be displaceable in the direction of displacement of the carriage 14. There is inserted into the intermediate element a rotation-damping element 28, per se, the toothed wheel of which engages with a toothed rack 30 which is fixed relative to the housing. The rotation-damping element 28 damps the displacement movement of the intermediate element 26 and hence also the displacement movement of the carriage 14. The scroll spring 22 pulls the intermediate element 26 in the double housing 12 forwards.

The intermediate element 26 has an arm 32 at the free end of which a toothed wheel 34 is rotatably mounted. The toothed wheel 34 engages with a toothed rack 36 which is integral with the double housing 12. On an opposite side, the toothed wheel 34 engages with a toothed rack 38 which is fixed relative to the carriage 14 and its integral with the carriage 14. The toothed wheel 34 converts the displacement of the intermediate element 26 into a double displacement, so that the carriage 14 travels twice the distance of the intermediate element 26. In the inserted position shown in FIG. 3, the carriage 14 is held against the force of the scroll spring 22 by a push-push or cardioid locking device 40. The locking device 40 is releasable by means of brief pressure against the front side of the holder 16.

The holder 16 is pivoted out to the side by a torsion spring element (not shown in the drawing). The torsion spring element is mounted on the pin 20 about which the holder 16 is pivotable, is supported on the carriage 14 and engages with the holder 16. Mounted in the base and in a cover of the double housing 12 is a guideway 42 in which a guide pin 44 of the holder 16 engages. In a rear region of the double housing 12, the guideway 42 extends in the direction of displacement of the carriage 14 close to the outside of the double housing 12. In the front region, the guideway 42 is obliquely directed. The guideway 42 and the guide pin 44 form a positive control means 42, 44 for the holder 16 and the carriage 14. As long as the guide pin 44 of the holder 16 is located in the rear portion of the guideway 42, that rear portion extending in the direction of displacement of the carriage 14, the guideway 42 prevents the holder 16 from pivoting. Only when the guide pin 44 passes into the obliquely directed from the region of the guideway 42 is the holder 16 able to pivot, the sliding position of the carriage 14 and the pivotal position of the holder 16 being dependent upon each other and the pivotal position of the holder 16 being predetermined by the sliding position of the carriage 14. The positive control means 42, 44 prevents the holder 16 from premature pivoting in the double housing 12, allowing pivotal movement of the holder 16 only when the carriage 14 has been pulled so far out of the double housing 12 that the holder 16 is located in the front of the double housing 12.

Pivotally mounted in the holder 16 are two substantially U-shaped loops that form supports 46, 48 for a beverage container inserted in the holder 16. One of the two supports 46 is pivotable upwards and the other support 48 is pivotable downwards. The lower support 48 is used for standing the drinks container that is inserted into the holder 16 upright and the other support 46 supports the beverage container laterally at its circumference. The two supports 46, 48 have a laterally projecting pivotal shaft 50, 52, about which the supports 46, 48 are pivotable. The pivotal shafts 50, 52 are pivotally mounted in the holder 16 parallel to and spaced from each other. Projecting from the pivotal shafts 50, 52 are ribs 54, 56 each extending like the thread of a screw. The lateral faces (screw faces) of the ribs 54, 56 lie against lugs 58, 60 which project from both sides of a slide member 62. The slide member 62 is mounted displaceably in the holder 16 parallel to the pivotal shafts 50, 52. As a result of displacement of the slide member 62, the lugs 58, 60 thereof slide along the ribs 54, 56 each extending like the thread of a screw, of the pivotal shafts 50, 52 of the supports 46, 48, and consequently pivot the supports 46, 48 flat into the holder 16. In the opposite direction, the supports 46, 48 are pivoted in a manner known per se by torsion spring elements, which are not shown in the drawings.

The slide member 62 has upwardly and downwardly projecting control pins 64 which pass through the holder 16 and lie displaceably in a control curve 66 in the carriage 14. The control curve 66 describes an arc of a circle around the pin 20 about which the holder 16 is pivotable, but the hypothetical centre point of the control curve 66 is located next to the pin 20 and spaced therefrom so that the spacing of the control curve 66 from the pin 20 about which the holder 16 is pivotable varies over the length of the control curve 66. As a result of that variation in the spacing of the control curve 66 from the pin 20 about which the holder is pivotable, when the holder 16 is pivoted on the carriage 14 the slide member 62 is displaced in the holder 16 by way of the control pin 64 which lies in the control curve 66. As a result of its displacement, the slide member 62 pivots the support 46, 48 in the manner described above.

It will be understood that each of the elements described above, or two or more together, may also find a useful application in other types of constructions differing from the types described above.

While the invention has been illustrated and described as embodied in holding device for a beverage container, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A holding device for a beverage container, installable in a motor vehicle, the holding device comprising a carriage displaceably guided from an inserted position into a pivoted-out position in a manner of a drawer; a sliding guide element which displaceably guides said carriage between said positions; a holder having an insertion opening for an insertion of a beverage container, said holder being pivotably mounted on said carriage; a pivotal joint through which said holder is pivotally mounted on said carriage, said holder being so mounted on said carriage as to be pivotable through approximately 90° to a side so that in said pivoted-out position said holder is located substantially at said side next to said carriage; at least one support for a beverage container inserted in said holder, said support being pivotably mounted on said holder and having a laterally projecting pivotal shaft about which said support is pivotable, said pivotable shaft having a threaded surface; and a slide member mounted on said holder and driven by a pivoting movement of said holder, said slide member sliding along said threaded surface of said pivotal shaft and pivoting said support.

2. A holding device as defined in claim 1; and further comprising positive control means for fixing a pivotal position of said holder relative to a sliding position of said carriage, said positive control means being effective between said carriage and said holder.

3. A holding device as defined in claim 1; and further comprising an opening spring element which moves said carriage from said inserted position into said pulled-out position.

4. A holding device as defined in claim 3; and further comprising an intermediate element which is engaged by said opening spring element and which is displaceably guided by said sliding guide element in a direction in which said carriage slides; and a toothed wheel which is mounted on said intermediate element to rotate about an axis perpendicular to a sliding direction; and a toothed rack unit including a fixed-position toothed rack and a toothed rack arranged opposite thereto which is fixed relative to said carriage, said toothed wheel engaging with said fixed-position toothed rack and with said tooth rack, said both toothed racks extending in the sliding direction.

5. A holding device as defined in claim 1, wherein said carriage has a control track, said slide member having a control element which engages in said control track in said carriage, said control track following an arcuate path around a pivotal axis of said holder and being spaced from said pivotal axis by a spacing which varies over a length of said control track.

* * * * *